(12) United States Patent
Altmaier

(10) Patent No.: US 10,743,695 B1
(45) Date of Patent: Aug. 18, 2020

(54) PACKAGE RECEIVING DEVICE

(71) Applicant: Jeff Altmaier, Glandale, AZ (US)

(72) Inventor: Jeff Altmaier, Glandale, AZ (US)

( * ) Notice: Subject to any disclaimer, the term of this patent is extended or adjusted under 35 U.S.C. 154(b) by 0 days.

(21) Appl. No.: 16/451,304

(22) Filed: Jun. 25, 2019

(51) Int. Cl.
*A47G 29/20* (2006.01)
(52) U.S. Cl.
CPC .................... *A47G 29/20* (2013.01)
(58) Field of Classification Search
CPC .... A47G 29/20; A47G 29/124; A47G 29/141; A47G 29/14; A47G 29/16; A47G 2029/144; A47G 2029/148; A47G 2029/149; B65D 7/24; B65D 7/26; B65D 21/086; E05B 65/0075
USPC .......... 232/19, 38, 45, 1 E; 220/6, 7, 8, 476; 70/63; 340/569
See application file for complete search history.

(56) References Cited

U.S. PATENT DOCUMENTS

| | | | | |
|---|---|---|---|---|
| 1,673,769 | A * | 6/1928 | Graham | G07C 13/02 220/6 |
| 1,915,980 | A * | 6/1933 | Craft | A47G 29/12 232/19 |
| 2,456,479 | A * | 12/1948 | Antil | A47G 29/14 220/6 |
| 5,774,053 | A * | 6/1998 | Porter | A47G 29/141 232/19 |
| 6,426,699 | B1 * | 7/2002 | Porter | A47F 10/00 221/2 |
| 6,540,134 | B1 * | 4/2003 | Rasche | A47G 29/14 220/4.28 |
| 10,321,780 | B1 * | 6/2019 | James | A47G 29/16 |
| 10,537,196 | B1 * | 1/2020 | MacPherson | A47G 29/16 |
| 2017/0188737 | A1 * | 7/2017 | Hippert | A47G 29/20 |
| 2018/0296016 | A1 * | 10/2018 | Teoh | A47G 29/20 |
| 2019/0225375 | A1 * | 7/2019 | Sena | B65D 21/086 |
| 2019/0320836 | A1 * | 10/2019 | Guanch | A47G 29/141 |
| 2020/0015616 | A1 * | 1/2020 | Sankaran | A47G 29/124 |
| 2020/0107663 | A1 * | 4/2020 | Eivaz | A47G 29/20 |

* cited by examiner

*Primary Examiner* — William L Miller
(74) *Attorney, Agent, or Firm* — Bruce A. Lev

(57) ABSTRACT

A package receiving device mountable to an exterior wall of a home or business structure that is collapsible into a flat stored configuration and expandable into a lockable package receiving receptacle having a rectangular volume adapted to temporarily store packages therein. Pivotable and folding panels are adapted to allow the package receiving device to be moved between a stored configuration and expand into an in-use configuration.

15 Claims, 6 Drawing Sheets

PACKAGE RECEIVING DEVICE

CROSS-REFERENCE TO RELATED APPLICATION

There are no related applications incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

This invention relates generally to package receiving devices mountable to an exterior wall of a home or business structure that is collapsible into a flat stored configuration and expandable into a lockable package receiving receptacle having a rectangular volume adapted to temporarily store packages therein.

2. Description of the Related Art

Various package receiving devices have been developed over the years that are adapted to temporarily and securely store packages therein for retrieval by an addressee. However, the prior and related art are relatively bulky, heavy, complex, and expensive.

Accordingly, the present invention overcomes these disadvantages by providing an apparatus that is more compact, simpler, light weight, and lower cost.

BRIEF SUMMARY OF THE INVENTION

In view of the foregoing disadvantages inherent in the known types of package receiving devices the instant invention is set forth. As such, the general purpose of the present invention, which will be described subsequently in greater detail, is to provide a new and improved package receiving device with all the advantages of the prior art and none of the disadvantages.

It is an object of the present invention to provide an improved package receiving device that is more compact, simpler, lighter in weight, easier to use, and much lower in cost than the prior art.

In short, the instant package receiving device is adapted to be attached to a building wall, or a vehicle wall adjacent to a truck bed, and includes a frame and a series of foldable panels attached to the frame designed and adapted to be stored against the frame in a collapsible configuration when not in-use and expandable into an in-use configuration forming a closable and lockable interior volume used to receive and securely and removably hold packages therein.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

BRIEF DESCRIPTION OF THE DRAWINGS

The figures which accompany the written portion of this specification illustrate embodiments according to the teachings of the present invention.

The various embodiments of the present invention will hereinafter be described in conjunction with the appended drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The following embodiments and the accompanying drawings, which are incorporated into and form part of this disclosure, illustrate embodiments of the invention and together with the description, serve to explain the principles of the invention. To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

Figure 1:
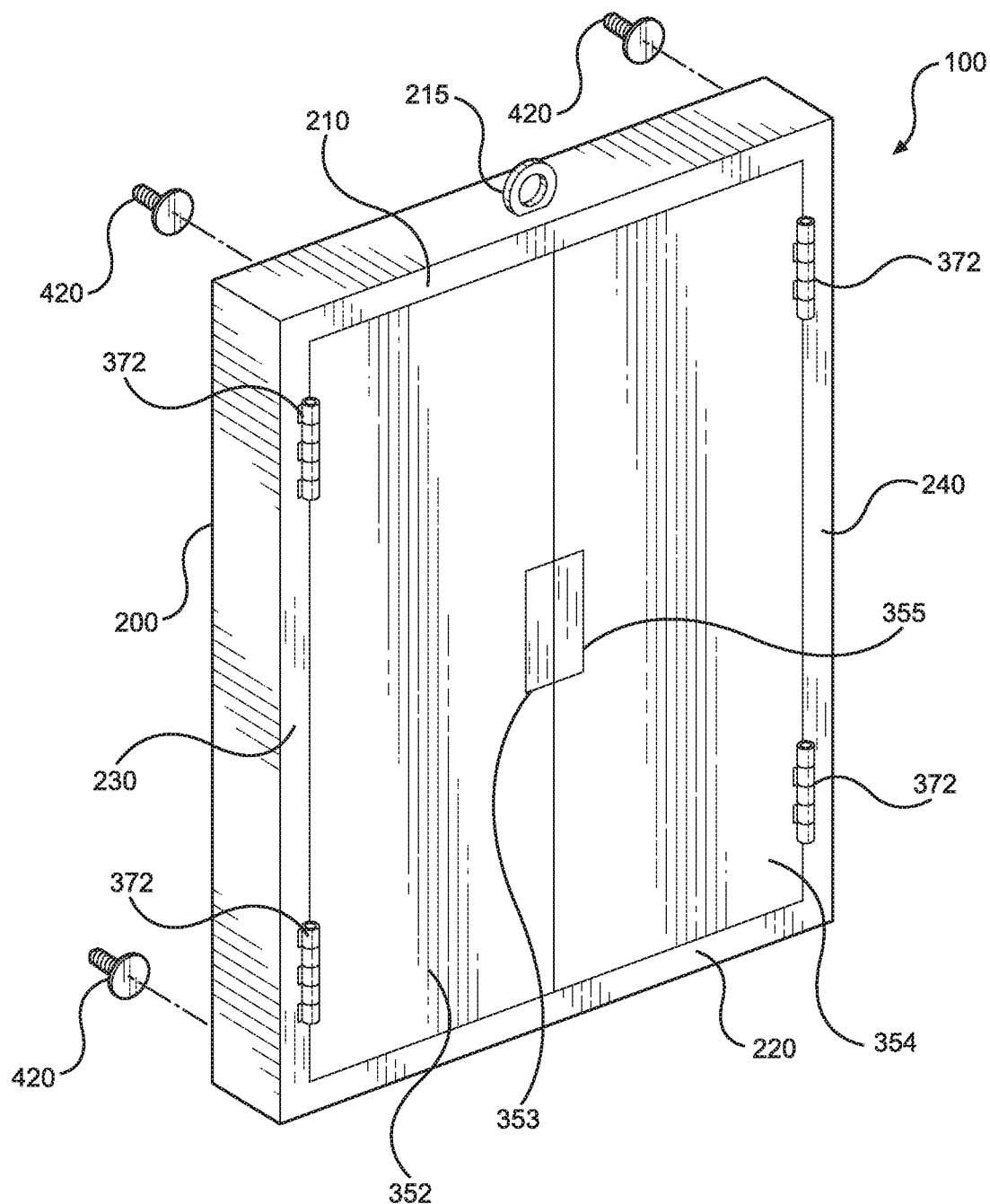
FIG. 1 shows a perspective view of the of the package receiving device in the stored configuration according to the preferred embodiment of the present invention.
Figure 2:
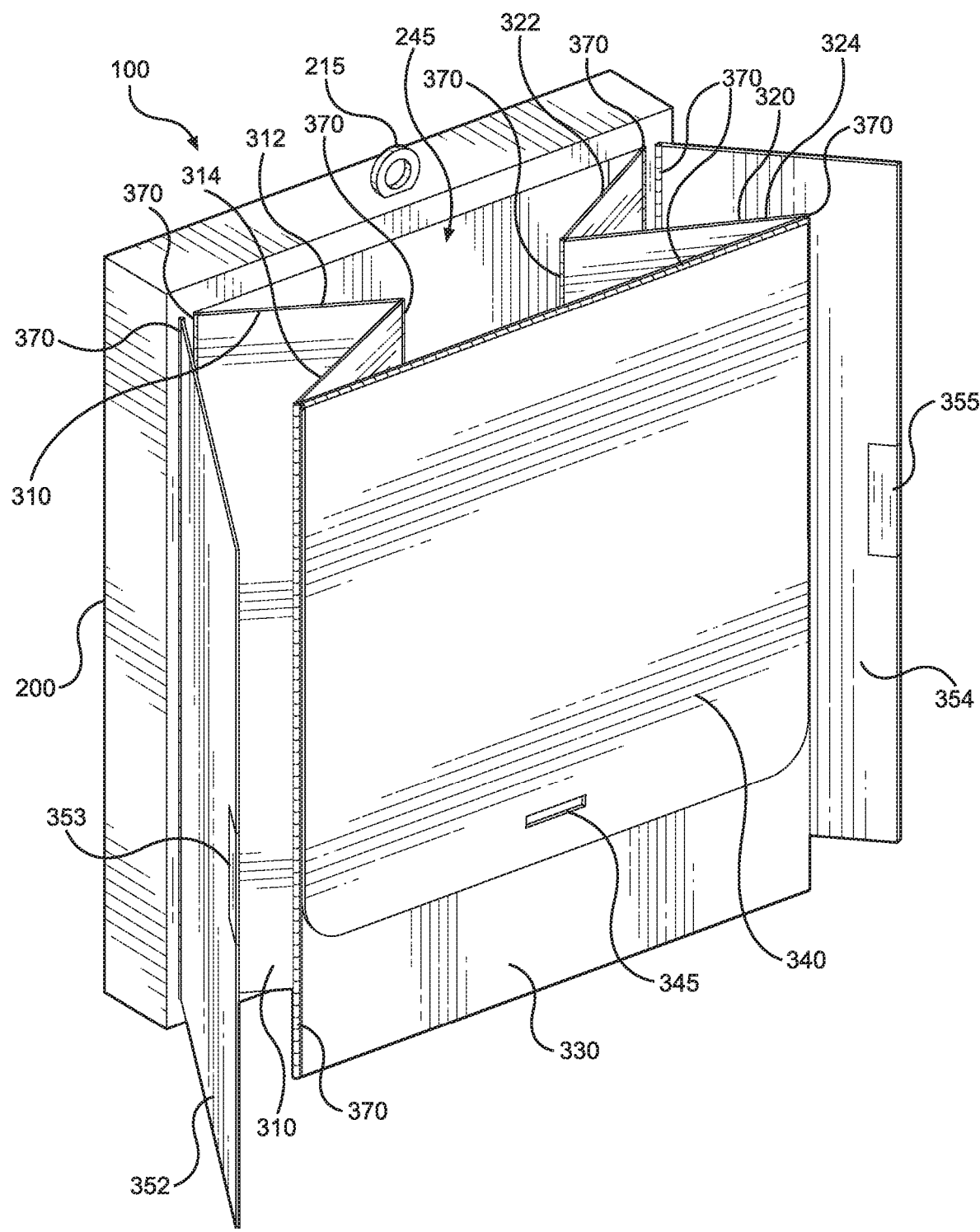
FIG. 2 shows a perspective view of the package receiving device being deployed into an in-use configuration according to the preferred embodiment of the present invention.
Figure 3:
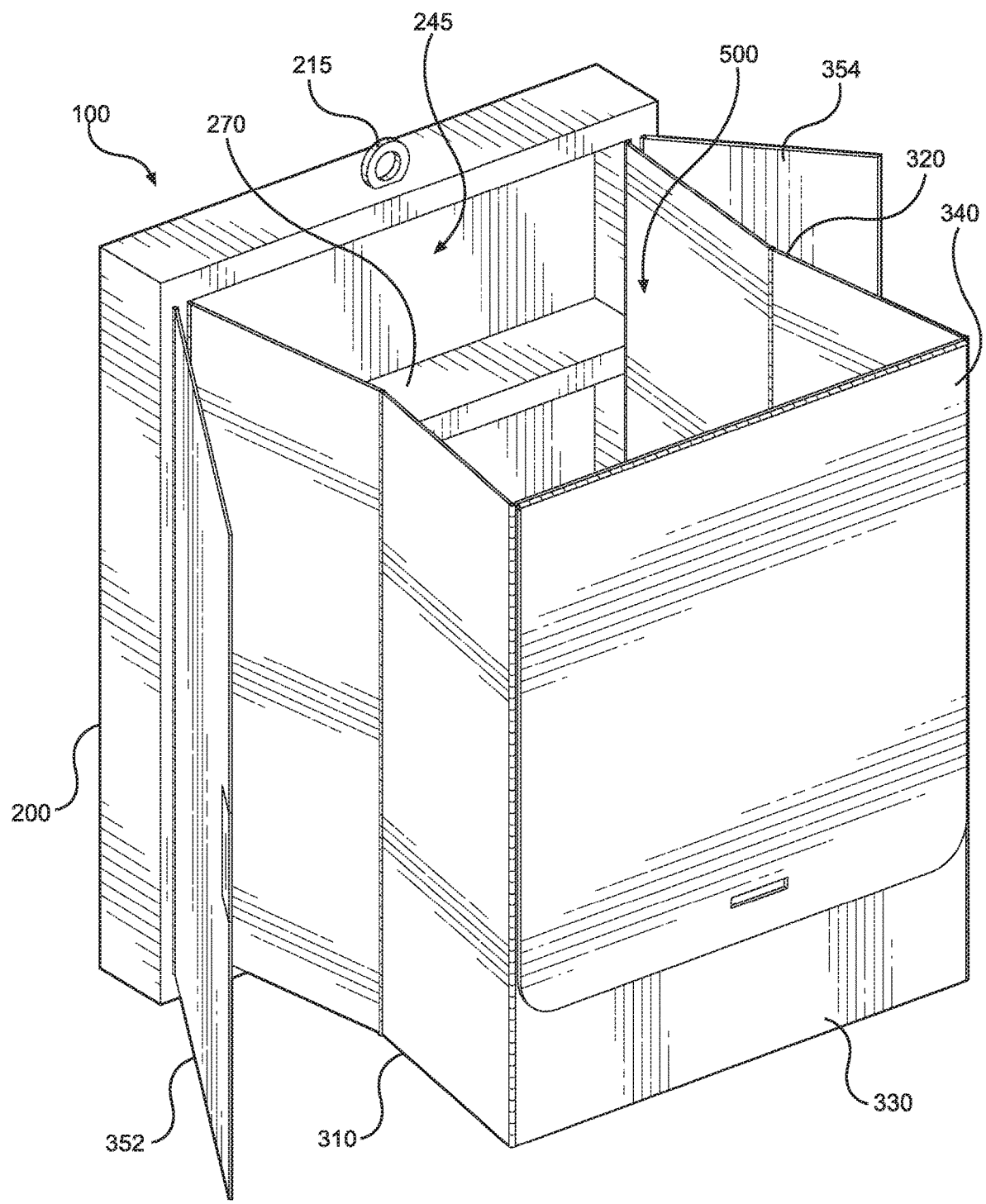
FIG. 3 shows another perspective view of the package receiving device being deployed into an in-use configuration according to the preferred embodiment of the present invention.
Figure 4:
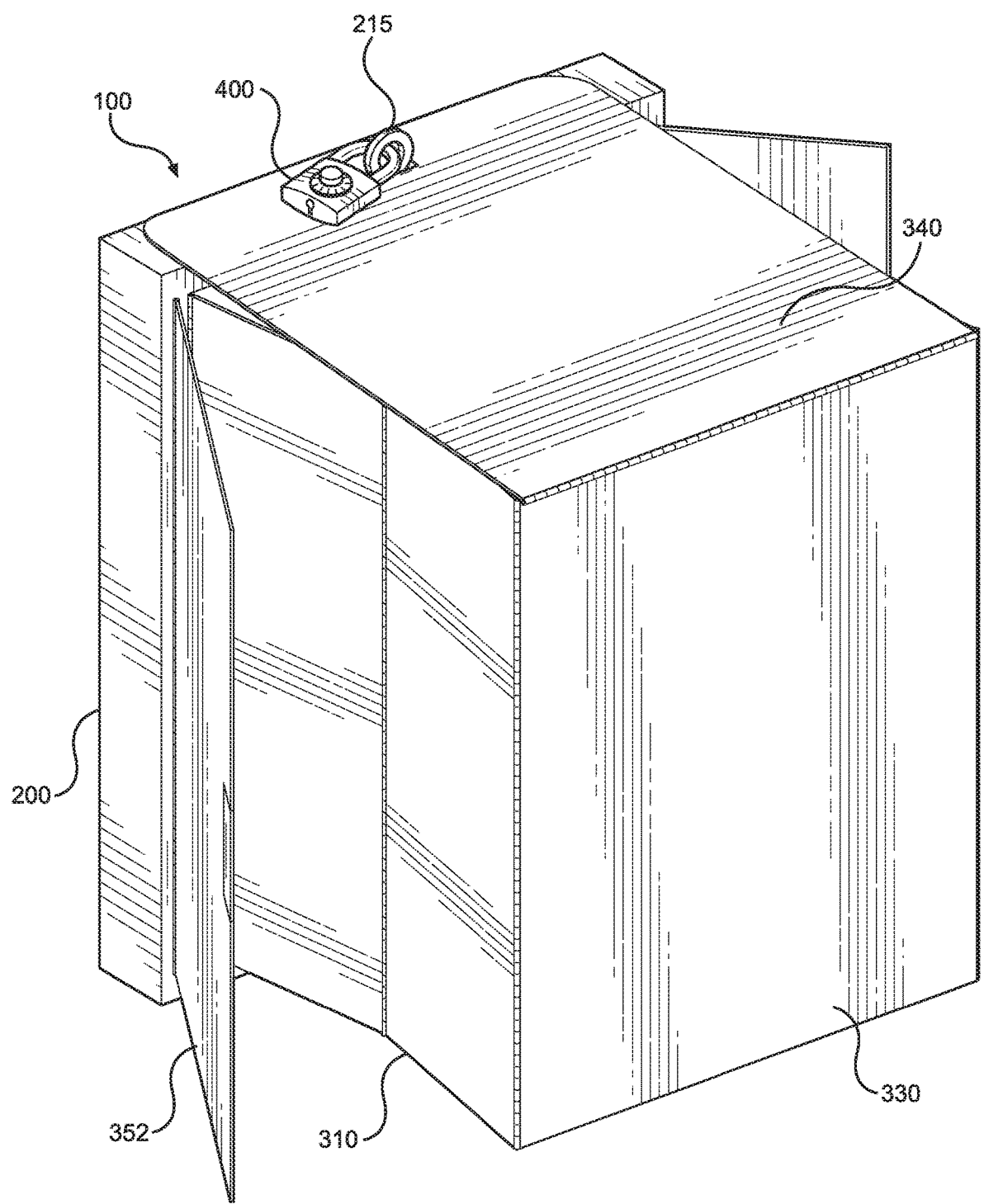
FIG. 4 shows a perspective view of the package receiving device in the in-use configuration with the top panel locked upon the frame according to the preferred embodiment of the present invention.
Figure 5:
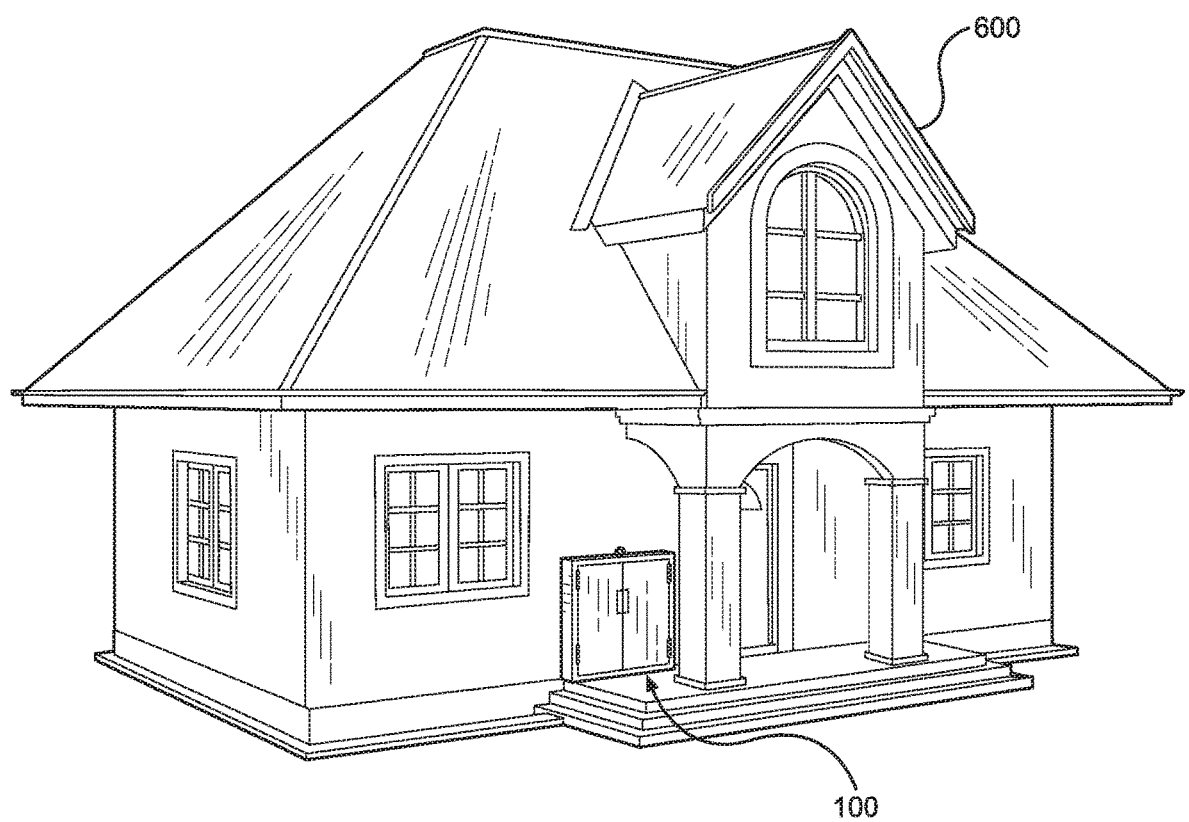
FIG. 5 shows a perspective view of the package receiving device attached upon the wall of a residential/business structure according to the preferred embodiment of the present invention.
Figure 6:
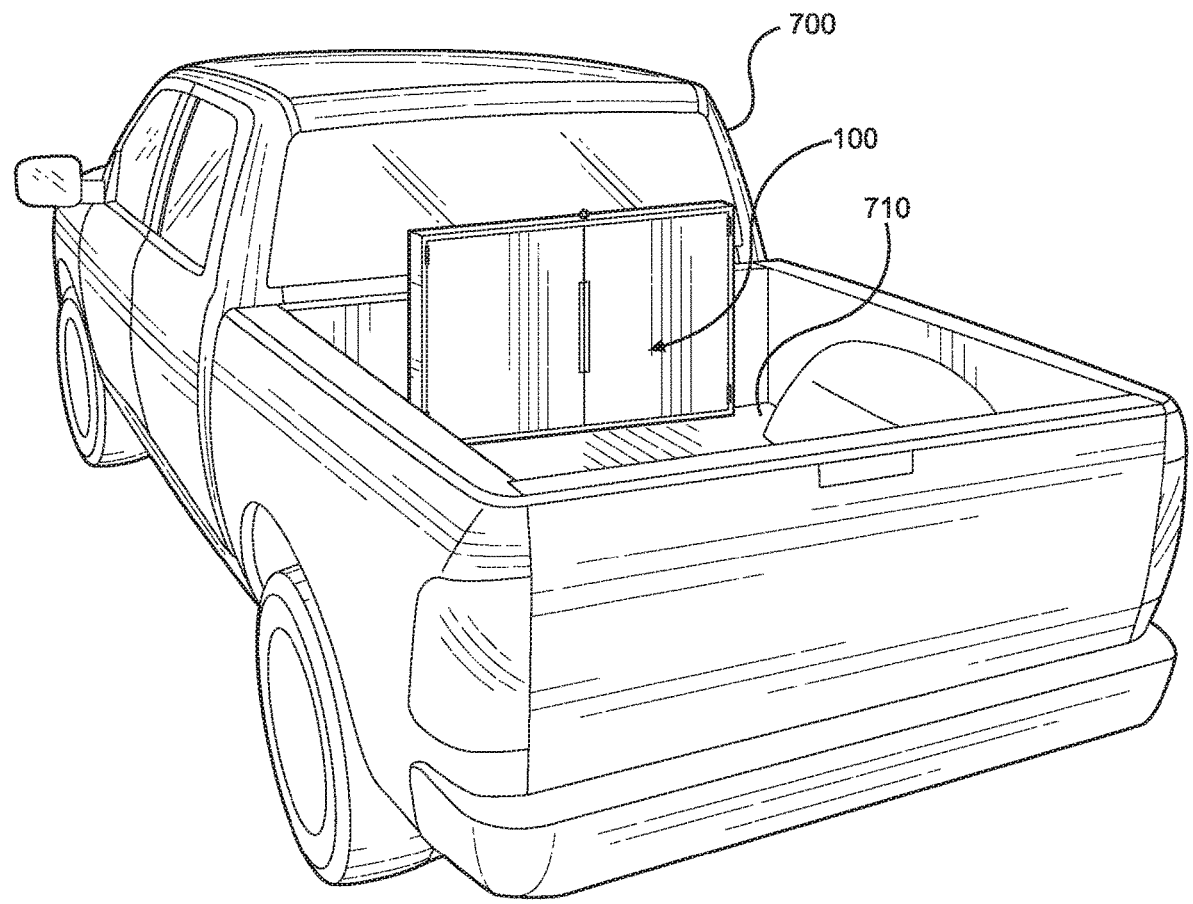
FIG. 6 shows a perspective view of the package receiving device attached upon the wall of a truck bed of a truck according to the preferred embodiment of the present invention.

As illustrated in FIGS. 1-6, the present invention discloses a package receiving device 100 comprising a frame 200 including an elongated top cross member 210 including a lock ring 215 attached to an upper edge thereof, an elongated bottom cross member 200, an elongated left side vertical member 230, an elongated right side vertical member 240, wherein the elongated top cross member and the elongated bottom cross member are spaced from one another and extend substantially parallel to one another, are spaced from one another, and extend substantially parallel to one another, and wherein respective end portions are connected together to form a rectangular shape forming a center opening 245 having a height and a width; a left side folding panel 310 comprising two panel portions 312 and 314, pivotally connected together at respective edge portions thereof, and wherein the left side folding panel is pivotally connected to the elongated left side vertical member at an edge portion thereof, is formed having a height substantially equal to the height of the center opening of the frame, and defines a width when said two panel portions are in an extended position; a right side folding panel 320 comprising two panel portions 322 and 324 pivotally connected together at respective edge portions thereof, and wherein the right side folding panel is pivotally connected to the elongated right side vertical member at an edge portion thereof, is formed having a height substantially equal to the height of the center opening of the frame, and defines a width when said two panel portions are in an extended position; a front panel 330 pivotally connected to respective edge portions of the left and right side folding panels opposite from the edge portions of that are pivotally connected to the elongated right and left side vertical members, and is formed having a height substantially equal to the heights of the left and right side folding panels, and is formed having a width substantially equal to the width of the center opening of the frame; a top panel 340 pivotally connected on an edge thereof to a top edge of the front panel, is formed having a width substantially equal to the width of the front panel, and is formed having a length substantially equal to the width of the left and right side folding panels when in said extended position, wherein the top panel includes a lock slot 345 located through an edge portion thereof opposite from the edge of pivotally connected to the front panel, and is adapted to allow the lock ring of the top cross member of the frame to pass therethrough; and a lock 400 adapted to be removably connected to the lock ring of the top cross member of the frame when the lock ring is in position through the lock slot, to thereby lock the top panel to the top cross member of the frame. The package receiving device is adapted to be folded into a stored configuration that is relatively flat, wherein the front panel, the left and right side folding panels, and the top panel are then adapted to be pulled out from the frame and pivoted into an in-use configuration forming a substantially rectangular volume 500, and wherein the top panel is adapted to be pivoted above the rectangular volume and removably locked via the lock ring, the lock slot, and the lock to the top cross member of the frame to securely and removably enclose the rectangular volume, such that when in the in-use configuration a package can be placed within the rectangular volume and removably locked therein until the lock is removed and the package removed from the rectangular volume.

The package receiving device may further comprise a left front door 352 and a right front door 354 each pivotally attached on an edge thereof to respective left and right side vertical members, wherein the left and right front doors have a height substantially equal to the height of the front panel, such that when in the stored configuration the left and right front doors pivot towards one another and substantially cover the front panel; wherein the left front door has a left door connector 353 on an edge portion opposite from the edge pivotally connected to the left side vertical member, and wherein the right front door has a right door connector 355 on an edge portion opposite from the edge pivotally connected to the right side vertical member, such that the left and right door connectors are removably connectable to one another to removably hold the left and right doors together in a closed configuration when the package receiving device is in said stored configuration.

The frame may further include at least one middle cross member 270 connected between the left and right side vertical member spaced from the top and bottom cross members, and is configured substantially parallel to the top and bottom cross members.

The two panel portions of the left side folding panel are pivotally connected to one another via at least one hinge member 370, and wherein the two panel portions of the right side folding panel are pivotally connected to one another via at least one hinge member 370; wherein the left side folding panel is pivotally connected to the elongated left side vertical member via at least one hinge member 370, and wherein the right side folding panel is pivotally connected to the elongated right side vertical member via at least one hinge member 370; wherein the top panel is pivotally connected to the front panel via at least one hinge member 370; wherein the left front door is pivotally attached to the left vertical member via at least one hinge member 372, and wherein the right front door is pivotally attached to the right vertical member via at least one hinge member 372.

The package receiving device further comprises at least one wall connector 420 adapted to securely connect the frame to a wall and may be formed as screws or nuts and bolts.

The frame 200 is formed from iron, steel, or aluminum; and the left and right side folding panels 310 and 320, the front panel 330, and the top panel 340 are formed from steel or aluminum.

The rectangular volume 500 may be between 2 and 3 feet in height; between 1 and three feet in width; and between 2 and 3 feet in length.

The lock 400 may be formed as a keyed padlock or as a combination padlock.

The instant package receiving device can be used in numerous environments. The main use is upon and attached to the wall of a business or residential structure 600. Alternative uses include being attached within and upon the wall of a truck bed 710 of a truck 700.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention.

Although the invention has been explained in relation to its preferred embodiment, it is to be understood that many other possible modifications and variations can be made without departing from the spirit and scope of the invention.

What is claimed is:

1. A package receiving device comprising:
 a frame including:
  an elongated top cross member including:
   a lock ring attached to an upper edge thereof;
  an elongated bottom cross member;
  an elongated left side vertical member;

an elongated right side vertical member;
  wherein said elongated top cross member and said elongated bottom cross member are spaced from one another and extend substantially parallel to one another;
  wherein said elongated left side vertical member and said elongated right side vertical are spaced from one another and extend substantially parallel to one another; and
  wherein respective end portions of said elongated top cross member, said elongated bottom cross member, said left side vertical member, and said right side vertical member are connected together to form a rectangular shape forming a center opening having a height and a width;
a left side folding panel comprising:
  two panel portions;
    wherein said two panel portions are pivotally connected together at respective edge portions thereof;
  wherein said left side folding panel is pivotally connected to said elongated left side vertical member at an edge portion thereof;
  wherein said left side folding panel is formed having a height substantially equal to said height of said center opening of said frame; and
  wherein said left side folding panel defines a width when said two panel portions are in an extended position;
a right side folding panel comprising:
  two panel portions;
    wherein said two panel portions are pivotally connected together at respective edge portions thereof;
  wherein said right side folding panel is pivotally connected to said elongated right side vertical member at an edge portion thereof;
  wherein said right side folding panel is formed having a height substantially equal to said height of said center opening of said frame; and
  wherein said right side folding panel defines a width when said two panel portions are in an extended position;
a front panel;
  wherein said front panel is pivotally connected to respective edge portions of said left and right side folding panels opposite from said edge portions of said left and right side folding panels that are pivotally connected to said elongated right and left side vertical members;
  wherein said front panel is formed having a height substantially equal to said heights of said left and right side folding panels; and
  wherein said front panel is formed having a width substantially equal to said width of said center opening of said frame;
a top panel;
  wherein said top panel is pivotally connected on an edge thereof to a top edge of said front panel;
  wherein said top panel is formed having a width substantially equal to said width of said front panel;
  wherein said top panel is formed having a length substantially equal to said width of said left and right side folding panels when in said extended position;
  wherein said top panel includes a lock slot located through an edge portion thereof opposite from said edge of said top panel pivotally connected to said front panel, and adapted to allow said lock ring of said top cross member of said frame to pass therethrough; and
a lock;
  wherein said lock is adapted to be removably connected to said lock ring of said top cross member of said frame when said lock ring is in position through said lock slot, to thereby lock said top panel to said top cross member of said frame;
wherein said package receiving device is adapted to be folded into a stored configuration that is relatively flat;
wherein said front panel, said left and right side folding panels, and said top panel are adapted to be pulled out from said frame and pivoted into an in-use configuration forming a substantially rectangular volume; and
wherein said top panel is adapted to be pivoted above said rectangular volume and removably locked via said lock ring, said lock slot, and said lock to said top cross member of said frame to securely and removably enclose said rectangular volume, such that when in said in-use configuration a package can be placed within said rectangular volume and removably locked therein until the lock is removed and the package removed from said rectangular volume.

2. The package receiving device of claim 1, further comprising a left front door and a right front door each pivotally attached on an edge thereof to respective said left and right side vertical members; wherein said left and right front doors have a height substantially equal to said height of said front panel, such that when in said stored configuration said left and right front doors pivot towards one another and substantially cover said front panel.

3. The package receiving device of claim 2, wherein said left front door has a left door connector on an edge portion opposite from said edge pivotally connected to said left side vertical member; and wherein said right front door has a right door connector on an edge portion opposite from said edge pivotally connected to said right side vertical member, such that said left and right door connectors are removably connectable to one another to removably hold said left and right doors together in a closed configuration when said package receiving device is in said stored configuration.

4. The package receiving device of claim 1, wherein said frame further includes a middle cross member connected between said left and right side vertical member, is spaced from said top and bottom cross members, and is substantially parallel to said top and bottom cross members.

5. The package receiving device of claim 1, wherein said two panel portions of said left side folding panel are pivotally connected to one another via at least one hinge member; and
  wherein said two panel portions of said right side folding panel are pivotally connected to one another via at least one hinge member.

6. The package receiving device of claim 1, wherein said left side folding panel is pivotally connected to said elongated left side vertical member via at least one hinge member; and
  wherein said right side folding panel is pivotally connected to said elongated right side vertical member via at least one hinge member.

7. The package receiving device of claim 1, wherein said top panel is pivotally connected to said front panel via at least one hinge member.

8. The package receiving device of claim 1, wherein said left front door is pivotally attached to said left vertical member via at least one hinge member; and wherein said right front door is pivotally attached to said right vertical member via at least one hinge member.

9. The package receiving device of claim 1, further comprising at least one wall connector adapted to securely connect said frame to a wall.

10. The package receiving device of claim 9, wherein said wall connector is selected from a group consisting of screws, and nuts and bolts.

11. The package receiving device of claim 1, wherein said frame is formed from a material selected from a group consisting of iron, steel, and aluminum.

12. The package receiving device of claim 1, wherein said left and right side folding panels, said front panel, and said top panel are formed from a material selected from a group consisting of steel and aluminum.

13. The package receiving device of claim 1, wherein said rectangular volume is between 2 and 3 feet in height; between 1 and three feet in width; and between 2 and 3 feet in length.

14. The package receiving device of claim 1, wherein said lock is formed as a keyed padlock.

15. The package receiving device of claim 1, wherein said lock is formed as a combination padlock.

* * * * *